No. 881,566. PATENTED MAR. 10, 1908.
F. M. EVERINGHAM, DEC'D.
M. EVERINGHAM, EXECUTRIX.
WEEDER ATTACHMENT TO CULTIVATORS.
APPLICATION FILED AUG. 23, 1907.

WITNESSES:
J. J. Laass
W. H. Meier Jr.

INVENTOR
Francis M. Everingham
deceased
Maryette Everingham
Executrix
By E. Laass, ATTORNEY.

THE NORRIS PETERS CO., WASHINGTON, D. C.

UNITED STATES PATENT OFFICE.

MARYETTE EVERINGHAM, OF EAST ONONDAGA, NEW YORK, EXECUTRIX OF FRANCIS M. EVERINGHAM, DECEASED.

WEEDER ATTACHMENT TO CULTIVATORS.

No. 881,566.  Specification of Letters Patent.  Patented March 10, 1908.

Application filed August 23, 1907. Serial No. 389,758.

*To all whom it may concern:*

Be it known that FRANCIS M. EVERINGHAM, late a citizen of the United States, and a resident of East Onondaga, in the county of Onondaga, State of New York, deceased, did invent a new and useful Improvement in Weeder Attachments to Cultivators, of which the following is a specification.

The purpose of this invention is to remove weeds, stones and other obnoxious substances from around the plants simultaneously with the operation of cultivating the said plants. And to that end the invention consists in the combination, with the cultivator frame, of a supplemental frame equipped with depending flexible tines disposed in rows diverging rearwardly from the central line of draft of the cultivator as hereinafter more fully described.

Figure 1:
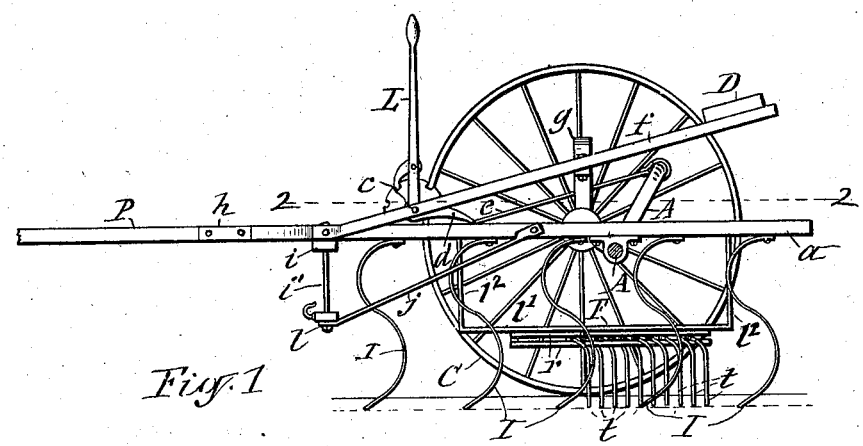
Figure 2:
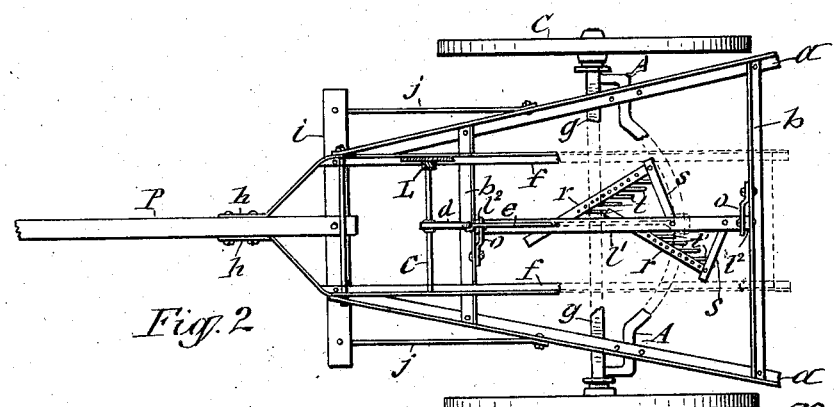
Figures 3, 4, 5:
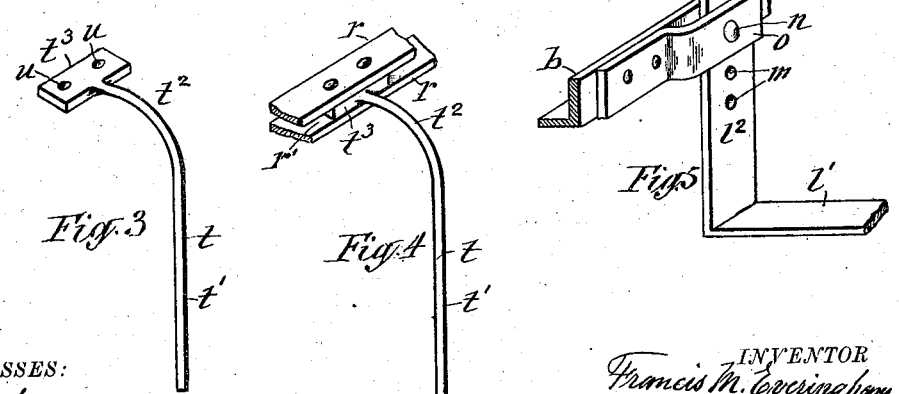

In the accompanying drawings, Figure 1 is a side elevation of a cultivator provided with the weeder-attachment; (one of the wheels being removed); Fig. 2 is a plan view of the same below the plane indicated by the broken line —2—2— in Fig. 1; Fig. 3 is an enlarged detached perspective view of one of the weeder tines; Fig. 4 shows the attachment of the said tine; and Fig. 5 shows the adjustable attachment of the weeder frame to the cultivator frame.

The cultivator frame consists mainly of the usual diverging side rails —a—a— tied to each other by means of transverse rails —b—b— which are rigidly attached at their ends to the aforesaid side rails. All of said rails are preferably made from angle iron or L-shaped steel bars to impart the requisite stability to the frame.

—A— denotes the cranked axle upon which the cultivator frame is mounted and adapted to be raised or lowered as may be desired by the adjustment of said axle which is effected by means of a hand lever —L— which is attached to a transverse shaft —c— pivoted to a suitable support on the cultivator frame and having fastened to it an arm —d— which is connected to the arched central portion of the axle by means of a rod —e— as shown in Fig. 1 of the drawings.

—C—C— are the carrying wheels which are journaled on the axle —A—.

—D— represents the driver's seat mounted on the rear ends of steel rails —f—f— which are rigidly secured to an arched cross plate —g— mounted on the axle —A— close to the hubs of the wheels —C—C—. The seat rails —f—f— extend forward to the inner sides of the side-rails —a—a— to which they are attached and from whence the rails —f—f— converge and terminate in forward extensions —h— which are fastened to opposite sides of the pole —P—. The rear end of said pole is attached to a cross bar —i— which is firmly connected to the front ends of the side rails —a—.

—l—l— represent the whiffle trees which are suspended from the ends of the bar —i— by means of rods —$i^1$— as shown in Fig. 1. —j—j— are rods connecting the whiffle trees to the side rails —a—a— at some distance from the front ends thereof.

—I—I— are the cultivator teeth which are curved S-shaped and are fastened to the underside of the horizontal webs of the side rails —a—a—.

—F— represents a supplemental frame which is disposed horizontally below the cultivator frame and firmly connected thereto. Said supplemental frame is preferably formed from a longitudinal flat steel bar —$l^1$— disposed in the central line of draft of the cultivator and formed with upwardly extending hangers —$l^2$—$l^2$— which are connected to the vertical webs of the transverse rails —b—b—. The said connection is made adjustable by the provision of a plurality of perforations —m— in the hangers —$l^2$—$l^2$— at different points in the length thereof.

A bolt —n— passing through one of the perforations of each hanger and through a perforation in the adjacent transverse rail and provided with a removable nut completes the attachment of the aforesaid supplemental frame to the cultivator frame. If desired the bolt —n— may be braced by a metal strap —o— attached at one end to the transverse rail —b— and engaging at the opposite end the bolt —n— as shown.

—r—r— represent arms attached at one end to the longitudinal bar —$l^1$— and extending obliquely rearward from opposite sides of said bar as shown in Fig. 2. Said arms are sustained at their rear ends by means of braces —s— connecting said ends to the bar —$l^1$—. Each of the arms —r— is composed of two flat metal plates or bars disposed parallel one over the other and with a space —$r^1$— between them as shown in Fig. 4.

—t—t— represent the tines of the weeder. Said tines are distributed lengthwise of the arms —r— and are thus in rows disposed divergent from the central line of draft. They consist of slender and flexible steel rods, the main or lower end portions of which are straight as shown at —$t^1$—. The upper end portions are curved as shown at —$t^2$— and terminate in perforated horizontal flat heads —$t^3$— which are inserted between the plates of the arm —r— as shown in Fig. 4 and are fastened therein by means of bolts or rivets passing through perforations —u—u— in the heads —$t^3$— of the tines and through the perforations in the arm —r—. The tines —t—t— extend rearwardly from the arms and in the operation of the cultivator said tines drag with their lower ends through the ground surrounding the plants and pull out the weeds and remove stones and other objectionable substances from around the plants without injury to said plants.

Claims:

1. The combination, with the cultivator-frame, of a longitudinal bar terminating in hangers connected to the cultivator-frame adjustably lengthwise of the hangers, arms extending from opposite sides of said longitudinal bar, and flexible tines depending from said arms and disposed in rearwardly divergent rows as set forth.

2. The combination with the cultivator-frame formed with side-rails carrying the cultivator teeth, and transverse rails tying the side-rails to each other, of a central longitudinal bar supported at each end on the transverse rails, separate arms extending from opposite sides of the central bar and equipped with weeder-teeth, and braces connecting the free ends of said arms separate and independently of each other to the aforesaid central bar.

MARYETTE EVERINGHAM, [L. S.]

*Executrix of the estate of Francis M. Everingham, deceased.*

Witnesses:
J. J. LAASS,
S. R. LAVINE.